Jan. 13, 1953  H. A. PURSCHE  2,625,091
TWO-WAY PLOW
Filed Oct. 17, 1947  4 Sheets-Sheet 2
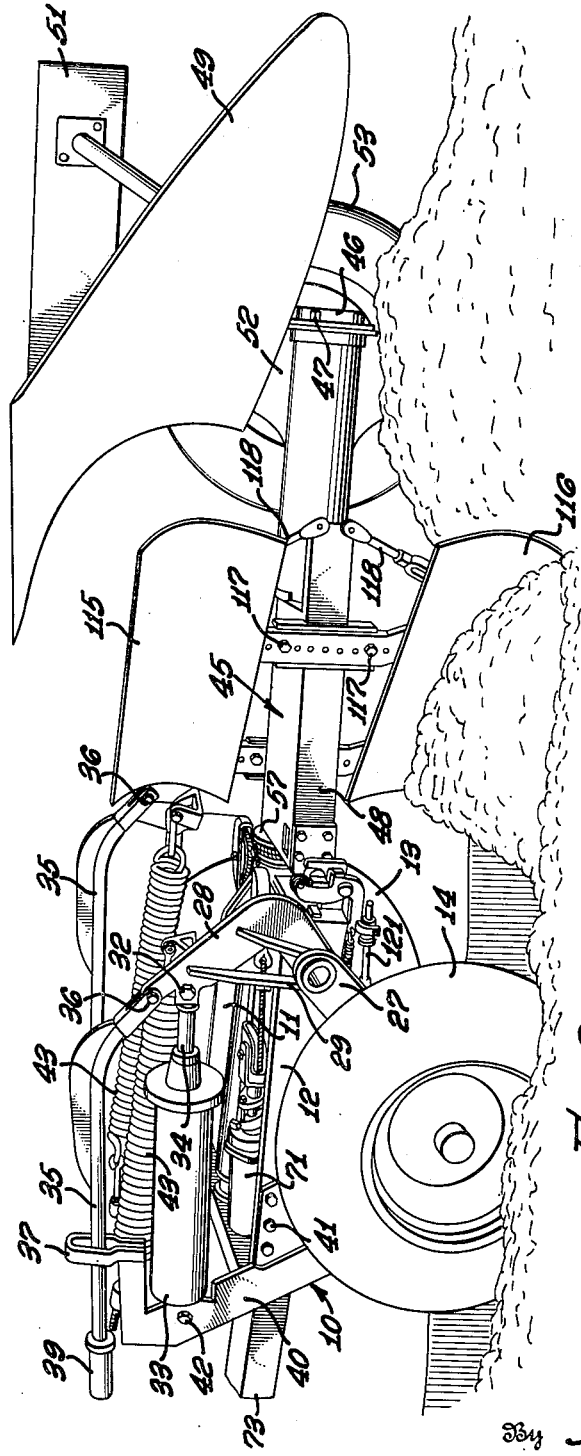
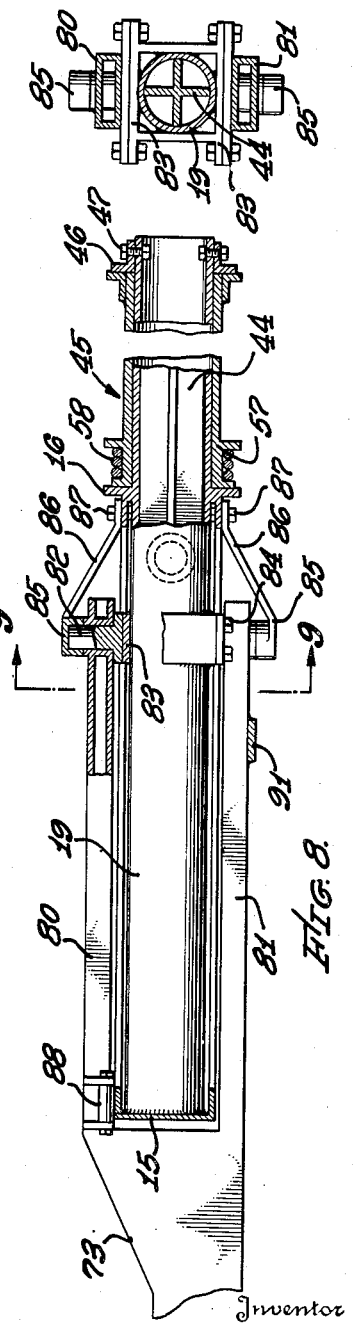
Inventor
HARRY A. PURSCHE
By Lyon & Lyon
Attorneys

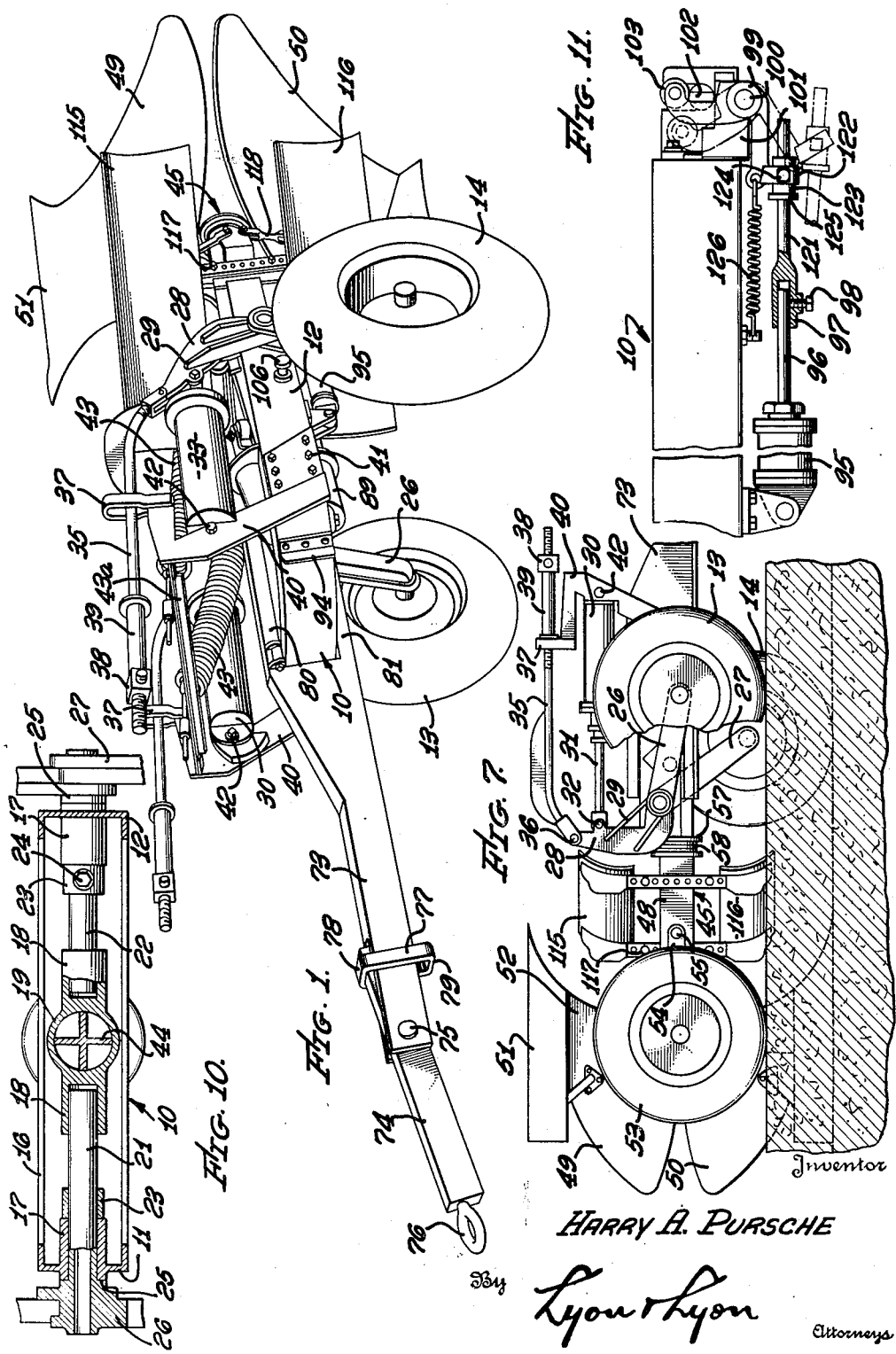

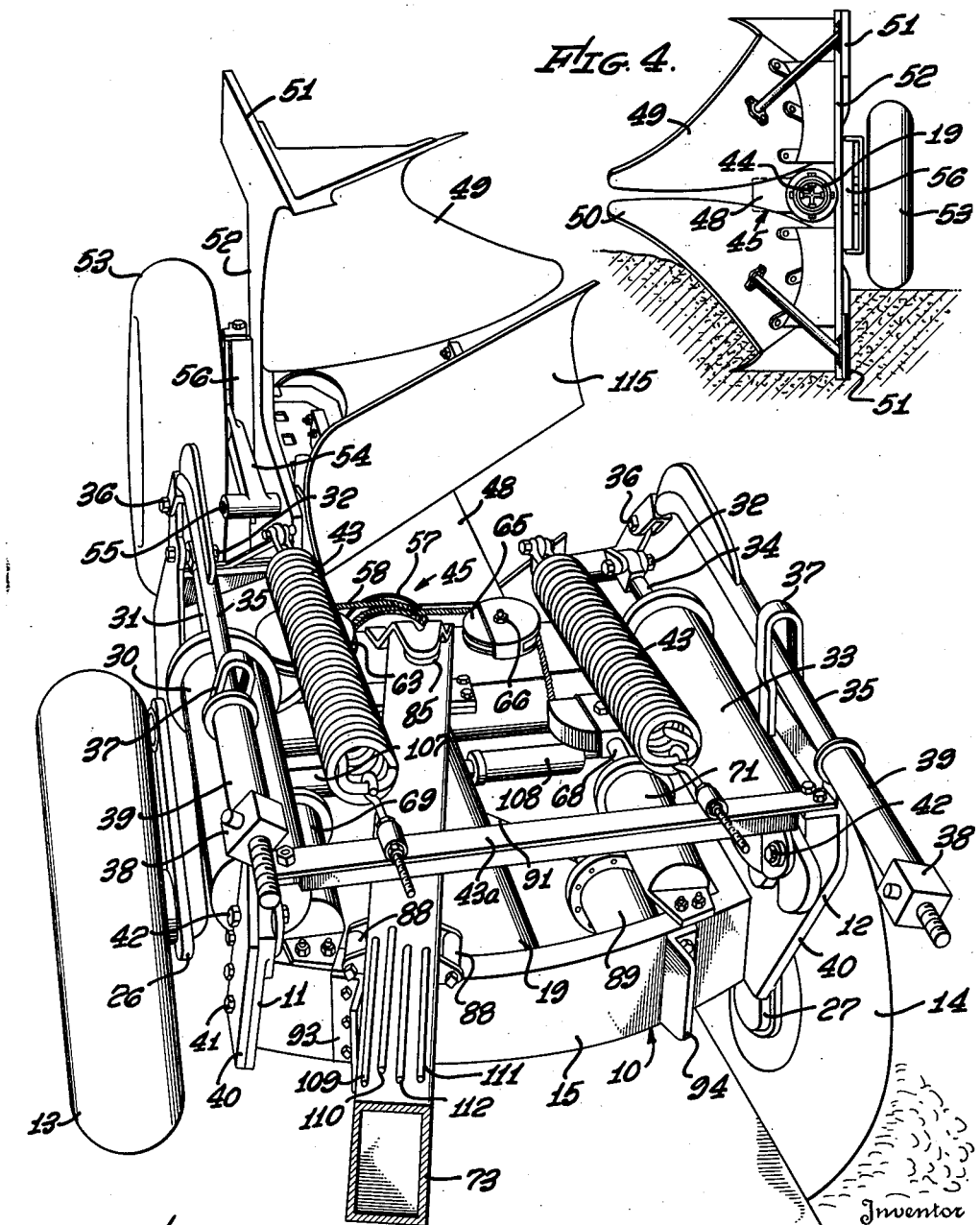

Jan. 13, 1953 H. A. PURSCHE 2,625,091
TWO-WAY PLOW
Filed Oct. 17, 1947 4 Sheets-Sheet 4
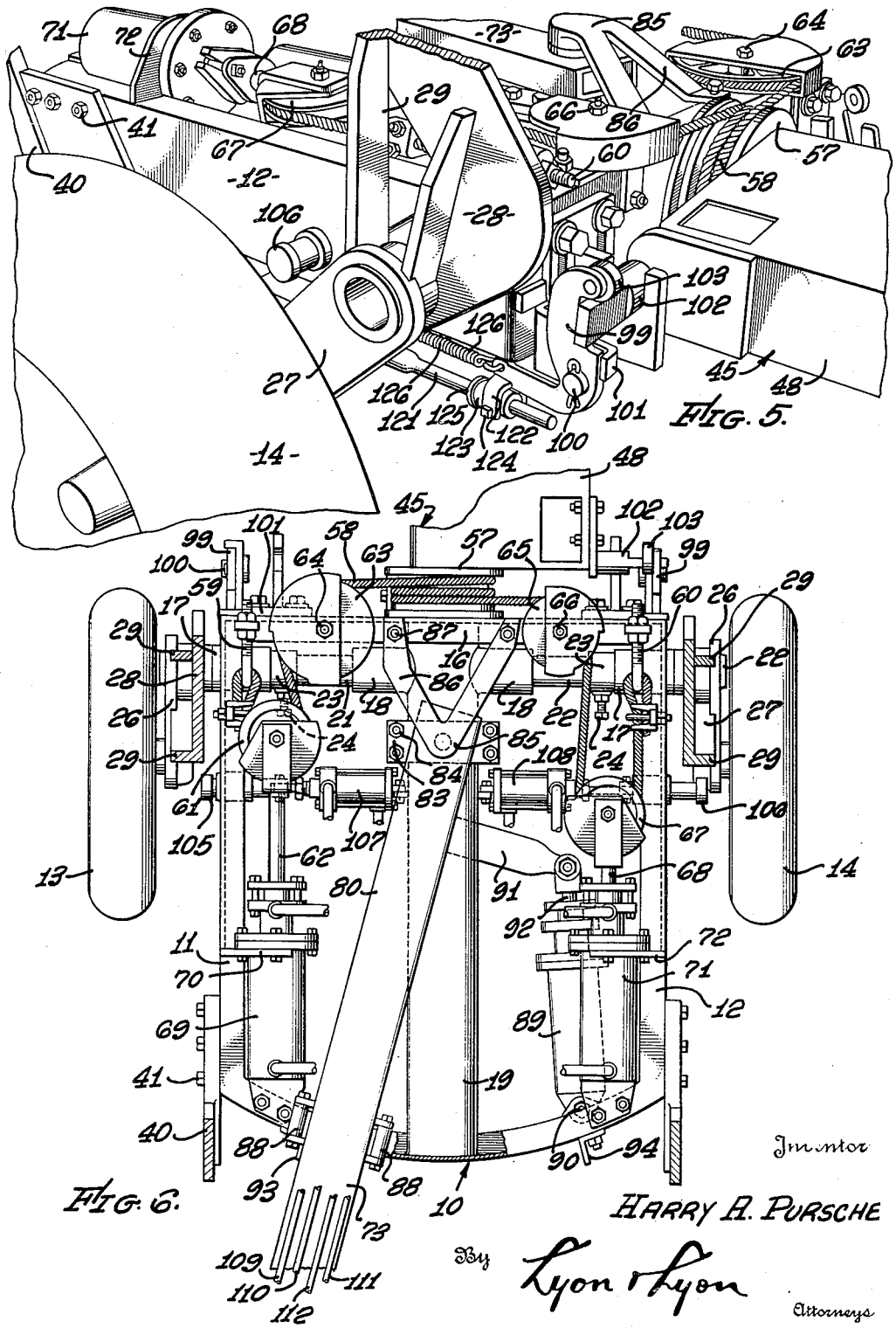
Inventor
HARRY A. PURSCHE
By Lyon & Lyon
Attorneys Patented Jan. 13, 1953

2,625,091

UNITED STATES PATENT OFFICE 2,625,091

TWO-WAY PLOW

Harry A. Pursche, Gardena, Calif.

Application October 17, 1947, Serial No. 780,417

26 Claims. (Cl. 97—26)

1

This invention relates to a two way plow and is particularly directed to improvements over the construction disclosed in my co-pending application, Serial No. 760,846, filed July 14, 1947.

The principal object of this invention is to provide a novel form of two-way plow.

A more detailed object is to provide a rotatable plow assembly carried on a mobile frame having means automatically operable to lock the plow assembly in position with respect to the frame.

Another object is to provide a pair of auxiliary scraper blades on the rotatable assembly in advance of the main plow shares in order to remove trash and insure proper operation of the main plow shares.

Another object is to provide a two way plow of this type having a tail wheel carried by the rotatable plow assembly, which tail wheel rolls on unplowed ground, the tail wheel being positioned adjacent a standard for the plow runners so that the bank which the tail wheel rolls upon is adequately supported.

Another object is to provide a plow of this type having means for maintaining the mobile frame in a substantially level position, although either one of the wheels is alternately positioned in a furrow.

A further object is to provide a novel form of mechanism for turning the rotatable plow assembly with respect to the mobile frame.

A related object is to provide a two way plow construction in which pressure fluid carried in two hydraulic lines is effective to operate in common the rotary plow assembly, a lock mechanism for maintaining the wheels in proper position with respect to the mobile frame, latching mechanisms for maintaining the roll-over plow assembly in selected position with respect to the frame, and the mechanism for shifting the pivoted tongue Other objects and advantages will appear hereinafter.

In the drawings:

Figure 1 is a perspective view of a two way plow comprising a preferred embodiment of my invention, the frame being in raised position.

Figure 2 is a perspective view showing the device in operative position with one wheel rolling in the furrow.

Figure 3 is a perspective view of the device as seen from the operator's position on a towing vehicle such as, for example, a tractor.

Figure 4 is a rear elevation showing the manner in which the plow runner supports the bank on which the tail wheel rolls.

2

Figure 5 is a perspective view partly broken away showing details of the roll-over mechanism and the latches for holding the rotary plow assembly in selected position.

Figure 6 is a plan view partly broken away and partly in section showing details of the mounting of the pivoted tongue and of the power means for rolling the plow assembly with respect to the frame.

Figure 7 is a side elevation.

Figure 8 is a partial longitudinal sectional elevation taken along the axis of the rotary plow assembly.

Figure 9 is a transverse sectional elevation taken substantially on the lines 9—9 as shown in Figure 7.

Figure 10 is a transverse sectional detail taken along the axis of the wheel actuating shafts.

Figure 11 is an enlarged detail of one of the latch mechanisms for maintaining the rotary plow assembly in selected position on the mobile frame.

Referring to the drawings:

A rigid frame 10 having parallel side members 11 and 12 is supported by spaced transverse ground contacting wheels 13 and 14. The side members 11 and 12 of the frame 10 are joined at their forward ends by the arcuate front piece 15 and the rear transverse beam 16. A pair of stationary journals 17 which are in axial alinement are provided on the side members 11 and 12, and alined journals 18 are carried by the central wish bone or stationary beam member 19. Wheel supporting shafts 21 and 22 extend through the alined journals 17 and 18 on each side of the frame 10. The shafts 21 and 22 may be solid or of tubular construction as shown. A collar 23 is provided on each of the shafts between the journals 17 and 18, and a set screw 24 on each collar is adapted to secure the collar to its respective shaft. From this description it will be understood that the shafts 21 and 22 are turnably mounted on the frame 10, and that the collars 23 prevent the shafts from moving outwardly with respect to the frame 10.

Shoulders 25 provided on each of the wheel shafts engage the outer ends of the journal 17 to prevent inward movement of the shafts. A crank arm 26 is fixed on the outer projecting end of the shaft 21 and rotatably supports the wheel 13 at its outer end. Similarly, the crank arm 27 is fixed on the outer projecting end of the shaft 22 and rotatably carries the wheel 14 at its outer end.

Separate means are provided on the frame 10 for turning each of the wheel shafts 21 and 22. As shown in Figures 1 and 7, this means may include an actuating arm 28 fixed upon the wheel shaft and provided with stiffener braces 29. A hydraulic power cylinder 30 having a piston rod 31 is pivotally connected to the arm 28 at 32, so that the cylinder 30 may turn the wheel shaft and hence raise and lower the wheel 13 with respect to the frame 10. Similarly, a second power cylinder 33 fixed on the frame 10 is provided with a piston rod 34 for raising and lowering the wheel 14. The cylinders 30 and 33, together with the associated linkage mechanism for raising and lowering the wheels, are substantially duplicates.

The extent of turning movement of each of the wheels 13 and 14 about the axis of its relative wheel shaft is adapted to be limited by the stop element 35. This stop element is pivotally connected to the actuating arm 28 at 36 and extends through an opening provided in the stationary collar 37. A nut 38 threadedly mounted on the stop element 35 is adapted to engage a compression sleeve 39 positioned on the element 35 between the collar 37 and the nut 38. The stop element 35 is adapted to slide through the opening in the collar 37 when the power cylinder 30 is energized to cause the wheel 13 to descend with respect to the frame 10. The collar 37 is carried on a bracket 40 attached to the side member 11 by any convenient means such as by bolts 41. The power cylinder 30 is pivotally mounted on the bracket 40 at 42. A similar stop element, nut, collar and sleeve are provided for regulating the maximum travel of the wheel 14. From the above description it will be understood that the wheel 13 may be lowered with respect to the frame by energizing the power cylinder 30, and that the stop element 35 and its related parts serve to adjustably limit the extent of maximum movement of the wheel 13.

In a similar manner the power cylinder 33 is adapted to raise and lower the wheel 14 with respect to the frame 10, and a similar adjustable stop means is provided for regulating the maximum travel of the wheel 14. A coil spring 43 is provided for each of the actuating arms 28 for counterbalancing the weight of the frame 10, thereby reducing the force required by the power cylinders 30 and 33 for lowering the wheels 13 and 14 with respect to the frame. The forward end of each spring 43 is adjustably anchored to a stationary cross brace 43a secured to the upper ends of the brackets 40.

The stationary beam member 19 extends longitudinally of the frame 10 and is welded or otherwise fixed to the cross-members 15 and 16. The stationary beam member may comprise a section of heavy wall pipe having internal reinforcement 44. The member 19 extends rearwardly from the cross-member 16 to support a carrier generally designated 45. The carrier is rotatably mounted on the member 19 and is confined between the cross-member 16 and the removable collar 46 which is fixed on the extreme rear end of the member 19 by means of the bolts 47. The carrier 45 includes a box section 48 which carries a right-hand plow share 49 and a left-hand plow share 50. The plow shares are diametrically opposed in relation to the axis of the stationary beam member 19 and are adapted to be alternately brought into plowing position. It is to be understood that the particular form of plow share used is not important to my invention, and any conventional type of plow share or plow disc may be used.

A landside 51 is provided for each of the plow shares, and a vertical standard 52 connects the landsides 51. A tail wheel 53 is rotatably mounted on the carrier 45 in a position adjacent the standard 52. The tail wheel 53 rolls on unplowed ground and thereby regulates the depth of furrows made by either of the plow shares 49 or 50. A rearwardly extending arm 54 rotatably supports the tail wheel axle, and this arm is pivotally mounted on the carrier 45 at 55. Arcuate movement of the tail wheel axle about the pivot point 55 is limited by any preferred form of adjustable stops 56, so that the depth of furrows cut by the plow shares may be regulated as desired. The stops 56 may be similar to those described in detail in my copending application above entitled.

The tail wheel 53 is necessarily located off-center with respect to the axis of the longiturinal beam 19 and therefore tends to balance the eccentric weight of the plow shares 49 and 50. It has been found in practice, however, that the tail wheel must be mounted fairly close to the longitudinal axis of the beam 19 in order that the carrier 45 and its associated parts may be approximately balanced on the beam 19. The tail wheel 53 is therefore placed adjacent the standard 52 connecting the landside 51 in order that the standard and lower landside may support the unplowed ground upon which the tail wheel rolls.

Means are provided for rolling the carrier 45 with respect to the longitudinal beam 19 in order to bring either one of the plow shares 49 or 50 into position. As shown in Figures 5, 6 and 8 of the drawings, this means includes a spooling drum 57 fixed on the carrier 45 and adapted to receive a plurality of wraps of a flexible cable 58. One end of the cable 58 is fixed to the frame 10 by means of the adjustable screw element 59, and the other end is similarly fixed to the element 60. The cable passes from the element 59 around the pulley 61 which is mounted on the piston rod 62, and then passes around the large pulley 63 to the drum 57. The pulley 63 is mounted for rotation about the pin 64 which is fixed on the frame 10. The cable 58 then passes from the drum 57 to the small pulley 65 which is rotatably mounted on the stationary pin 66 carried on the frame. The cable passes from the small pulley 65 around the pulley 67 which is rotatably mounted on the piston rod 68 and is then secured to the frame by the adjustable element 60 as described above.

The piston rod 62 extends from the power cylinder 69 which is mounted on the frame 10 by means of the bracket 70. Similarly, the piston rod 68 extends from the power cylinder 71 which is mounted on the bracket 72. When the cylinder 69 is energized to retract the piston rod 62, the pulley 61 is moved with the rod 62 to cause the cable 58 to turn the drum and carrier 45 to bring the left-hand plow share 50 into operative position as shown in Figure 3. When the power cylinder 71 is energized, the piston rod 68 is retracted and the cable 58 turns the drum 57 in the opposite direction to move the carrier 45 to the position shown in Figure 6, in which position the right-hand plow share 49 is in operative position. It will be understood that the movement of the cable 58 is double the stroke of the piston rods 62 or 68 because of the provision of the pulleys 61 and 67. A transfer bypass 120 connects the blind ends of the power cylinders 69 and 71.

As explained in my co-pending application above referred to, it is ordinarily necessary to shift the tongue of a two way plow whenever the carrier for the plow share is rotated. This shift in the position of the tongue is required to position the plow device properly behind the towing vehicle such as, for example, a tractor. The present invention contemplates the provision of a novel form of shiftable tongue. As shown in the drawings the tongue 73 is provided with a link 74 at its forward end pivotally mounted on a transverse pin 75. An eye or any other suitable form of hitch connection 76 is provided on the forward end of the link 74. Pivotal motion of the link 74 with respect to the tongue 73 is limited by means of the collar 77 providing fixed stops 78 and 79.

The tongue 73 is bifurcated along its rearward portion to provide upper and lower forks 80 and 81. These forks straddle the arcuate front piece 15, and each is pivotally connected to a stationary pin 82 fixed on the pads 83 by means of the bolts 84. The pads 83 are secured to the longitudinal beam 19 by any convenient means such as, for example, by welding. In order that each of the pins 82 may operate in double shear and to minimize bending stresses, caps 85 are provided which are fixed on the cross-member 16 by means of the straps 86 and screw elements 87. When it is desired to remove the tongue assembly from the frame the screw elements 87 are removed to permit the caps 85 and straps 86 to be disassembled from the pins 82. The bolts 84 are then removed to disconnect the pins 82 from the central longitudinal beam 19. The tongue 73 may then be moved forwardly and laterally to a position in which the pins 82 may be disassembled, thereby permitting the bifurcated forks 80 and 81 of the tongue 73 to pass forwardly without interference with the arcuate front piece 15. Rollers 88 may be mounted at the forward end of the fork 80 for rolling on the arcuate front piece 15. Frictional resistance against pivotal movement of the tongue about the alined pins 82 is thereby minimized.

A double acting power cylinder 89 pivotally mounted at 90 on the front piece 15 is pivotally connected to a crank arm 91 fixed on the lower fork 81. As shown in Figure 6, when the power cylinder 89 is energized to retract its piston rod 92 the tongue 73 is shifted to the left, and when the power cylinder is energized to extend the rod 92 the tongue 73 is shifted to the right. Limit stops 93 and 94 are adjustably mounted on the arcuate front piece 15 for contact with the tongue 73.

Means are provided for latching the carrier 45 in either of its operative positions in order to prevent undesirable rotary movement of the carrier relative to the frame while either of the plow shares is in operation. As shown in the drawings, this latch means includes a pair of power cylinders 95 having piston rods 96 connected by sleeve 97 and set screw 98 to the actuating rods 121. Latch members 99 are pivotally mounted on stationary pins 100 carried on stationary brackets 101 projecting rearwardly from the frame 10, and each of the latch members 99 is provided with a bifurcated portion 122 through which the rod 121 projects. A sleeve 123 is pivotally carried by the bifurcated portion 122 on pins 124. A collar 125 fixed on the rod 121 is adapted to engage the end of the sleeve 123. A latch bar 102 fixed to the carrier 45 is adapted to strike the brackets 101 to limit the extent of its travel in either direction. The latch 99 is provided with a roller 103 along which the latch bar 102 is adapted to move in order to engage the bracket 101. When one of the power cylinders 95 is actuated to retract its piston rod 96, the latch 99 is moved into operative position by the spring 126 to maintain the latch bar 102 against displacement.

When the appropriate power cylinder 69 or 71 is actuated to roll the carrier 45 with respect to the frame 10, one of the power cylinders 95 is energized to extend its piston rod 96 and thereby release its respective latch 99. The other power cylinder 95 is energized to retract its piston rod and hence permit the spring to bring its respective latch 99 into operative position. The dotted lines in Figure 11 illustrate the inoperative position of the latch. From this description it will be understood that a power cylinder 95 and latch mechanism is located on each side of the frame 10, and that when one of the latches 99 is operative the other is inoperative, and vice versa. The purpose of the latch roller is to reduce frictional resistance, and accordingly it is recognized that the roller could be mounted on the latch bar 102 instead of on the latch 99 if desired.

In the normal use of the plow device one of the wheels 13 or 14 rolls in a furrow previously made while the other wheel rolls on unplowed ground. Thus, as shown in Figure 3, when the wheel 14 is rolling in the furrow the left-hand plow share 50 is in operative position and the right-hand plow share 49 is inoperative. As shown in Figure 2, when the right-hand plow share 49 is rotated into operative position the wheel 13 rolls in the furrow and the wheel 14 rolls on unplowed ground. In order that the frame 10 and its associated mechanism may remain substantially horizontal when either of the wheels 13 and 14 is rolling in a furrow, I prefer to provide stop means for limiting the degree of movement of the wheel which rolls in the furrow.

As clearly shown in Figures 5 and 6, I prefer to provide a pair of outwardly movable stop lugs 106 and 105 which are mounted for transverse sliding movement in the side members 11 and 12 respectively of the frame 10. A power cylinder 107 is provided for projecting and retracting the stop lug 105, and similarly a power cylinder 108 is provided for projecting and retracting the stop lug 106. When the stop lug 106 is in its projected position it lies in the path of movement of the arm 27 carrying the wheel 14 and limits the extent of pivotal movement of the arm 27 about the axis of the shaft 22. Similarly, when the stop lug 105 is in its projected position it lies in the path of motion of the arm 26 carrying the wheel 13, and hence limits the extent of pivotal movement of the arm 26 about the shaft 21. The cylinders 107 and 108 are hydraulically connected so that one of the stop lugs is advanced while the other is in its retracted position. The proper stop lug is projected to limit the movement of the wheel which is to roll in the furrow while the stop lug adjacent the wheel rolling on the ground is retracted to an inoperative position.

Four hydraulic lines are preferably provided for operating the various power cylinders on the plow device. These four lines 109, 110, 111 and 112 extend to a pressure pump (not shown) which may be conveniently located on the towing vehicle. The lines 109 and 110 are connected to operate the power cylinders 30 and 33 for raising and lowering the wheels 13 and 14 with respect to the frame 10. The other two hydraulic lines 111 and 112 are adapted to actuate the power cylinders 69 and 71 for the carrier roll-over mechanism, the power cylinders 107 and 108 for the stop lugs 105 and 106 respectively, the power cylinders 95 for operating the latch mechanisms, and the power cylinder 89 for shifting the tongue 73. Thus when the hydraulic line 109 is pressurized and the hydraulic line 110 acts as a return to the pump, the pressure fluid is admitted into the blind ends of the wheel actuating cylinders 30 and 33 to cause the wheels 13 and 14 to be raised with respect to the frame 10, that is to permit the frame 10 to descend with respect to the ground. When the hydraulic line 110 is pressurized and the line 109 serves as a return, pressure fluid is admitted into the piston rod ends of the cylinders 30 and 33 to lower the wheels 13 and 14 with respect to the frame 10 and hence raise the frame 10 upwardly with respect to the ground. Figure 1 shows this upper position of the frame.

When the hydraulic line 111 is pressurized and the line 112 serves as a return, pressure is admitted into the piston rod end of the cylinder 71, thereby tensioning the cable 58 to cause the carrier 45 to turn to the position illustrated in Figure 6, the transfer bypass 120 serving to deliver fluid from cylinder 71 to cylinder 69. Pressure in the hydraulic line 111 is also communicated to the blind end of the cylinder 108 and the forward end of the cylinder 107, thereby advancing the stop lug 106 and retracting the companion lug 105. Pressure within the line 111 further acts to pivot the tongue 73 to the position shown in Figure 6 by causing the cylinder 89 to retract the piston rod 92. The same pressure within the line 111 also energizes the latch 99 on the right side of the frame 10 as viewed in Figure 6 to maintain the carrier 45 in the position shown. At the same time the cylinder 95 on the other side of the frame is energized to extend its piston rod and move its corresponding latch to a release position, such as indicated by the dotted lines in Figure 11.

When the hydraulic line 112 is pressurized and the line 111 acts as a return to the pump, the cylinder 69 is energized to roll the carrier 45 from the position shown in Figure 6 to the position shown in Figure 3, the cylinders 107 and 108 advance the lug 105 and retract the lug 106, the cylinder 89 shifts the tongue 73 to the right as viewed in Figure 6, while the latch 99 on the left side of the frame 10 engages the carrier 45 and the other latch on the other side of the frame becomes inoperative.

The operation of my improved two way plow is similar to that of the device described in the aforesaid co-pending application. The plow device is towed behind a tractor or other suitable vehicle, and the hydraulic lines 109, 110, 111 and 112 are connected to a suitable hydraulic system including a pump and control valves. The pump and control valves are preferably located on the tractor. The plow is rolled into position, and while forward motion is underway the frame 10 is lowered by pressurizing the cylinders 30 and 33 to lower the wheels 13 and 14 with respect to the frame 10. One of the wheels 13 or 14 rolls in a furrow previously made, and the other, together with the tail wheel 53, rolls on unplowed ground. A corresponding plow share 49 or 50 is operative, depending on which of the wheels rolls in the furrow.

When the end of the field is reached the cylinders 30 and 33 are again energized to cause the frame 10 to rise and thus bring the plow share out of the ground so that the assembly assumes the position illustrated in Figure 1. The tractor and plow are then turned around and started back along the furrow just made. The hydraulic lines 111 and 112 are then used to (a) roll the carrier 45 to bring the other plow share into position, (b) shift the pivoted tongue 73, (c) retract one of the lugs 105, 106 and extend the other, and (d) energize one of the latches 99 and de-energize the other. The cylinders 30 and 33 are again energized through the hydraulic lines 109 and 110 to allow the frame 10 to descend and re-engage the other plow share with the soil. While either one of the plow shares is in operation the frame 10 is supported by the wheels 13, 14 and 53 in a three point suspension which is independent of the towing vehicle. The pivot 75 on the tongue 73 permits slight variations in height of the towing vehicle and the plow device owing to minor irregularities in the surface of the land.

The scraper blades 115 and 116 which are adjustably mounted on the box section 48 by means of the bolts 117 scrape the surface of the unplowed ground in advance of the plow share 49 or 50 to deposit weeds or other trash in the furrow and hence be immediately covered by the earth turned over by the following plow share. The depth of cut of the scraper blades 115 and 116 may be regulated by the adjustment provided by the bolts 117, and their angular position may be regulated by suitably manipulating the turnbuckles 118.

It will be understood that the action of the stop lugs 106 and 105 is to maintain the frame 10 substantially level and avoid undesirable tilting movement about its longitudinal axis, even though one of the wheels 13, 14 rolls in a furrow while the other rolls on unplowed ground. Since the frame 10 is thus maintained substantially level, the engagement of the plow share with the soil remains at the proper angle.

Having fully described my invention, it is to be understood that I do not wish to be limited to the details herein set forth, but my invention is of the full scope of the appended claims.

I claim:

1. In a two way plow assembly the combination of a frame; a carrier mounted on the frame and provided with a right hand plow and a left hand plow; means including a power cylinder on the frame for rotating the carrier about a longitudinal axis to bring either plow into operative position; latch means including a second power cylinder on the frame, said latch means being engageable with the carrier to maintain either plow in operative position; and common means for energizing said power cylinders.

2. In a two way plow assembly the combination of a frame; a tongue pivotally connected to the frame for relative lateral movement; power means including a power cylinder on the frame for shifting the tongue; a carrier mounted on the frame and provided with a right hand plow and a left hand plow; power means including another power cylinder on the frame for rotating the carrier about a longitudinal axis to bring either plow into operative position; latch means positioned on the frame engageable with the carrier to maintain either plow in operative position; common hydraulic means for energizing the two said power cylinders and means operatively connecting the latch means for simultaneous operation with one of said power means.

3. In a two way plow assembly, the combination of a frame provided with laterally spaced supporting wheels; a carrier extending rearwardly from the frame and provided with a right-hand plow and a left-hand plow; hydraulic power means on the frame for turning the carrier about a longitudinal axis to bring either plow into operative position, said means including a cable drum on the carrier; a cable encircling the drum and having one end secured relative to the frame; a pulley engaging the cable between said cable end and the drum; and a power cylinder adapted to move the pulley in a direction substantially parallel to said longitudinal axis to effect turning movement of the drum and carrier.

4. In a two way plow assembly, the combination of a frame provided with laterally spaced supporting wheels; a carrier extending rearwardly from the frame and provided with a right-hand plow and a left-hand plow; hydraulic power means on the frame for turning the carrier about a longitudinal axis to bring either plow into operative position, said means including a cable drum on the carrier; a cable encircling the drum and having both ends secured to said frame; a pulley on each side of the drum engaging the cable; and parallel power cylinders alternately operable to move either of the pulleys in a direction to effect turning movement of the drum and carrier.

5. In a two way plow assembly, the combination of a mobile frame; a stationary beam member extending longitudinally of the frame and projecting rearwardly therefrom; a carrier turnably mounted on the projecting portion of said beam member and provided with a right-hand plow and a left-hand plow; power means on the frame adapted to turn the carrier to bring either plow into operative position; a pair of co-axial pivot pins secured relative to the frame and positioned above and below said beam member; a tongue having a bifurcated portion adapted to straddle said beam member, said pivot pins serving to connect the outer ends of said bifurcated portion to said frame; and power means on the frame adapted to shift said tongue about said pivot pins.

6. In a two way plow assembly, the combination of a mobile frame having parallel side members and an arcuate front member; a stationary beam member mounted centrally of the frame parallel to the side members and extending rearwardly from said frame; a carrier turnably mounted on the projecting portion of said beam member and provided with a right-hand plow and a left-hand plow; power means on the frame adapted to turn the carrier to bring either plow into operative position; a tongue having a bifurcated portion adapted to straddle the beam member and the arcuate front member; pivotal means connecting the outer ends of the bifurcated portion to said beam member; a roller on the tongue adapted to roll on the arcuate front member; and power means on the frame adapted to shift said tongue about said pivotal means.

7. In a two way plow assembly, the combination of: a mobile frame, a stationary beam member extending longitudinally of the frame and projecting rearwardly therefrom, a carrier turnably mounted on the projecting portion of said beam member and provided with plow means for forming a right-hand furrow and a left-hand furrow, a draft tongue, means forming a direct pivotal connection between the tongue and said beam member, and power means on the frame for shifting the tongue about said pivot means.

8. In a two way plow assembly, the combination of: a mobile frame, a stationary beam member extending longitudinally of the frame and projecting rearwardly therefrom, the frame having a pair of longitudinally spaced cross-members connected to said beam member, a carrier turnably mounted on the projecting portion of said beam member and provided with plow means for forming a right-hand furrow and a left-hand furrow, pivot means on the beam member positioned between said cross-members, a tongue extending forwardly from the frame and being directly connected to the beam member by said pivot means, and power means on the frame for shifting the tongue about said pivot means.

9. In a two way plow assembly, the combination of: a mobile frame having parallel side members and an arcuate front member, a stationary beam member mounted centrally of the frame parallel to the side members and extending rearwardly from said frame, a carrier turnably mounted on the projecting portion of the beam member provided with a right-hand plow and a left-hand plow, a tongue having a bifurcated portion adapted to straddle a portion of the frame including the arcuate front member, pivot means connecting the outer ends of the bifurcated portion to the frame, a roller on the tongue adapted to roll on the arcuate front member, and power means on the frame adapted to shift said tongue about said pivot means.

10. In a two way plow assembly, the combination of: a mobile frame, a stationary beam member mounted centrally of the frame and extending rearwardly therefrom, a carrier turnably mounted on the projecting portion of said beam member between the ends thereof and provided with plow means for forming a right-hand furrow and a left-hand furrow, a laterally projecting latch bar on the forward end of the carrier, and a pair of rearwardly projecting latches pivotally mounted on the frame at the rear portion thereof and laterally spaced for engaging the latch bar to maintain either plow in operative position.

11. In a two way plow assembly, the combination of: a mobile frame having parallel side members, a stationary beam member mounted centrally of the frame parallel to the side members and extending rearwardly from said frame, a carrier turnably mounted on the projecting portion of said beam member between the ends thereof and provided with plow means for forming a right-hand furrow and a left-hand furrow, a laterally projecting latch bar on the forward end of the carrier, a pair of rearwardly projecting latches pivotally mounted on the frame, one adjacent the rear end of each of the side members, said latches engaging the latch bar to hold either of said plows in operative position.

12. In a two way plow assembly, the combination of: a frame, a pair of wheel arms pivotally mounted on the frame for movement about a common transverse axis, a wheel rotatably mounted on each of the arms, means on the frame for turning the arms to raise and lower the wheels with respect to the frame, a carrier turnably mounted on the frame and provided with plow means for forming a right-hand furrow and a left-hand furrow, power means on the frame for turning the carrier to either of its operative positions, a pair of laterally spaced stop members on the frame, each mounted for transverse movement with respect to the frame, each of the stop members being movable into the path of movement of one of the wheel arms to limit movement thereof, and means operatively connected to said power means for alternately projecting each of said stop members in accordance with the position of the carrier.

13. In a two way plow assembly, the combination of a mobile frame, a stationary beam member extending longitudinally of the frame and projecting rearwardly therefrom, a carrier turnably mounted on the projecting portion of said beam member and provided with ground-engaging plow means for producing either a right-hand furrow or a left-hand furrow, power means on the frame for turning the carrier to either of two operative positions relative to the frame to cause the plow means to produce a right-hand furrow or a left-hand furrow as desired, a pair of coaxial pivot pins secured relative to the frame and positioned above and below said beam member, a tongue having a bifurcated portion adapted to straddle said beam member, said pivot pins serving to connect the outer ends of said bifurcated portion to said frame, and power means on the frame adapted to shift said tongue about said pivot pins.

14. In a two way plow assembly, the combination of a mobile frame having parallel side members and an arcuate front member, a stationary beam member mounted centrally of the frame parallel to the side members and extending rearwardly from said frame, a carrier turnably mounted on the projecting portion of said beam member and provided with ground-engaging plow means for producing either a right-hand furrow or a left-hand furrow, power means on the frame for turning the carrier to either of two operative positions relative to the frame to cause the plow means to produce a right-hand furrow or a left-hand furrow as desired, a tongue having a bifurcated portion adapted to straddle the beam member and the arcuate front member, a pivotal means connecting the outer ends of the bifurcated portion to said beam member, a roller on the tongue adapted to roll on the arcuate front member, and power means on the frame adapted to shift said tongue about said pivotal means.

15. In a two way plow assembly, the combination of a frame, transversely spaced supporting wheels on the frame alternately adapted to roll in a furrow, a carrier turnably mounted on the frame about a longitudinal axis and provided with a right-hand plow and a left-hand plow, each of the plows having a landside, a standard connecting the landsides, a pair of auxiliary scraper blades on the carrier, one in advance of each of said plows, means on the frame adapted to turn the carrier relative to the frame to bring either plow and its associated scraper blade into operative position and to bring the standards to a substantially vertical position, and a tail wheel on the carrier adapted to roll on unplowed ground adjacent said vertical standard.

16. In a two way plow assembly, the combination of a frame, a carrier mounted on the frame and provided with ground-engaging plow means for producing either a right-hand furrow or a left-hand furrow, power means on the frame for turning the carrier to either of two operative positions relative to the frame to cause the plow means to produce a right-hand furrow or a left-hand furrow as desired, a latch lug on the forward end of the carrier, a pair of laterally spaced latching elements movably mounted on the frame, the latch lug being engageable with either of said latching elements to maintain the carrier in either operative position, and means for operating the latching elements in response to actuation of said power means.

17. In a two way plow assembly, the combination of a frame provided with laterally spaced crank arms pivotally mounted for movement about a common transverse axis, a frame-supporting wheel on the swinging end of each crank arm, a carrier on the frame provided with ground-engaging plow means for producing either a right-hand furrow or a left-hand furrow, first power means on the frame for turning the carrier to either of two operative positions relative to the frame to cause the plow means to produce a right-hand furrow or a left-hand furrow as desired, second power means connected to swing the crank arms for raising and lowering the wheels with respect to the frame, and third power means connected for simultaneous operation with said first power means for limiting the extent of movement of said crank arms.

18. In a two way plow assembly, the combination of a frame provided with laterally spaced crank arms pivotally mounted for movement about a common transverse axis, a frame-supporting wheel on the swinging end of each crank arm, a carrier mounted on the frame and provided with ground-engaging plow means for producing either a right-hand furrow or a left-hand furrow, hydraulic power means on the frame for turning the carrier to either of two operative positions relative to the frame to cause the plow means to produce a right-hand furrow or a left-hand furrow as desired, hydraulic power means adapted to latch the carrier in either position, hydraulic power means adapted to limit the extent of movement of said crank arms, and a common supply conduit operatively connected to each of said hydraulic power means in order that they may be simultaneously energized.

19. In a two way plow assembly, the combination of a frame, a carrier on the frame and provided with ground-engaging plow means for producing either a right-hand furrow or a left-hand furrow, power means on the frame for turning the carrier to either of two operative positions relative to the frame to cause the plow means to produce a right-hand furrow or a left-hand furrow as desired, a pair of laterally spaced crank arms pivotally mounted on the frame for movement about a common transverse axis, a frame-supporting wheel on the swinging end of each crank arm alternately adapted to roll in a furrow, power means connected to swing the crank arms for raising and lowering the wheels with respect to said frame, adjustable stop means adapted to limit the maximum movement of each of said crank arms, and additional power operated stop means engageable with one of the crank arms to limit the extent of movement of the furrow wheel in order to minimize transverse tilt of the frame and carrier.

20. In a two way plow assembly, the combination of a frame, a carrier mounted on the frame and provided with ground-engaging plow means for producing either a right-hand furrow or a left-hand furrow, means including a power cylinder on the frame for turning the carrier to either of two operative positions relative to the frame to cause the plow means to produce a right-hand furrow or a left-hand furrow as desired, a pair of laterally spaced crank arms pivotally mounted on the frame for movement about a common transverse axis, a frame-supporting wheel on the swinging end of each crank arm

13 alternately adapted to roll in a furrow, and then upon unplowed land, interconnected hydraulic power means connected to swing the crank arms for raising and lowering each wheel with respect to said frame, stop means adapted to limit the maximum range of movement of each of said crank arms and thereby regulate depth of the furrows formed by said plows, and additional power operated stop means engageable with one of the crank arms to limit the travel of the furrow wheel within said range in order to minimize transverse tilt of the frame and carrier.

21. In a two way plow assembly, the combination of a frame, a carrier mounted on the frame and provided with ground-engaging plow means for producing either a right-hand furrow or a left-hand furrow, means including a power cylinder on the frame for turning the carrier to either of two operative positions relative to the frame to cause the plow means to produce a right-hand furrow or a left-hand furrow as desired, latch means including a second power cylinder on the frame, said latch means being engageable with the carrier to maintain either plow in operative position, and common means for energizing said power cylinders.

22. In a two way plow assembly, the combination of a mobile frame having parallel side members, an arcuate front member, and a transverse rear member, a stationary beam member mounted centrally of the frame parallel to the side members and fixed to the front and rear members, the beam member projecting rearwardly from said frame, a carrier turnably mounted on the projecting portion of the beam member and provided with ground-engaging plow means for producing either a right-hand furrow or a left-hand furrow, a tongue having a bifurcated portion adapted to straddle the beam member and the arcuate front member, pivotal means connecting the outer ends of the bifurcated portion to said beam member, a roller on the tongue adapted to roll on the arcuate front member, limit stops on the arcuate front member for limiting the extent of pivotal movement of the tongue, and power means on the frame adapted to shift the tongue about said pivotal means.

23. In a two way plow assembly, the combination of a frame, a tongue pivotally connected to the frame for relative lateral movement, power means including a power cylinder on the frame for shifting the tongue, a carrier mounted on the frame and provided with ground-engaging plow means for producing either a right-hand furrow or a left-hand furrow, means including a second power cylinder on the frame for turning the carrier to either of two operative positions relative to the frame to cause the plow means to produce either a right-hand furrow or a left-hand furrow as desired, latch means positioned on the frame and engageable with the carrier to maintain it in either operative position, common hydraulic means for energizing the two said power cylinders, and means operatively connecting the latch means for simultaneous operation with one of said power means.

24. In a two way plow assembly, the combination of a frame member, a tongue member pivotally connected to the frame member for relative lateral movement, power means including a power cylinder on one of the members for shifting the tongue member, a carrier mounted on the frame member and provided with ground-engaging plow means for producing either a right-hand furrow or a left-hand furrow, means on the

14 frame member for turning the carrier to either of two operative positions relative to the frame member to cause the plow means to produce either a right-hand furrow or a left-hand furrow as desired, a pair of laterally spaced crank arms pivotally mounted on the frame for movement about a common transverse axis, a supporting wheel on the swinging end of each crank arm alternately adapted to roll in a furrow, power means connected to swing the crank arms for moving the wheels relative to the frame member, adjustable stop elements adapted to limit the maximum movement of each of said crank arms, and retractable stop elements on the frame member each engageable with one of the crank arms to limit the extent of movement of the wheel in the furrow relative to the frame member.

25. In a two way plow assembly, the combination of: a frame, transversely spaced supporting wheels on the frame alternately adapted to roll in a furrow, a carrier turnably mounted on the frame about a longitudinal axis and provided with a right-hand plow and a left-hand plow, each of said plows having a landside, a standard connecting the landsides, means for lowering the wheels to different extents relative to the frame to minimize lateral tilting of the frame, means on the frame for turning the carrier relative to said frame to bring either plow into operative position and to bring the standard to a substantially vertical position, and a tail wheel on the carrier adapted to roll on unplowed ground adjacent said vertical standard.

26. In an agricultural implement, the combination of: a frame, ground wheels supporting the frame, a stationary longitudinal beam member fixed on and extending rearwardly from the frame, a draft tongue pivoted relative to the frame and extending forwardly therefrom, means on the frame whereby the frame and beam member may be raised and lowered relative to the ground wheels, a carrier having a tubular element axially insertable on the longitudinal member in telescopic relation, a thrust collar removably positioned on the longitudinal beam member and engaging the rear end of said tubular element to maintain the carrier in position relative to the frame, a ground-engaging tool, the carrier having support means for said tool mounted on said tubular element, and cooperating means on the frame and carrier for preventing turning movement of the carrier relative to the longitudinal beam member.

HARRY A. PURSCHE.

REFERENCES CITED

The following references are of record in the file of this patent:

UNITED STATES PATENTS

| Number | Name | Date |
|---|---|---|
| 258,288 | Durfee | May 23, 1882 |
| 308,335 | Haegg | Nov. 18, 1884 |
| 808,727 | Connor | Jan. 2, 1906 |
| 946,279 | Sidell | Jan. 11, 1910 |
| 997,102 | Tholl | July 4, 1911 |
| 1,517,086 | Mattice | Nov. 25, 1924 |
| 1,578,084 | Neufang | Mar. 23, 1926 |
| 1,908,095 | York | May 9, 1933 |
| 1,915,844 | York | June 27, 1933 |
| 2,079,595 | Collins | May 11, 1937 |

(Other references on following page)

UNITED STATES PATENTS

| Number | Name | Date |
|---|---|---|
| 2,153,824 | Collins | Apr. 11, 1939 |
| 2,227,366 | Pridgen | Dec. 31, 1940 |
| 2,327,927 | Orelind | Aug. 24, 1943 |
| 2,335,231 | Armington | Nov. 30, 1943 |
| 2,410,918 | Acton | Nov. 12, 1946 |

FOREIGN PATENTS

| Number | Country | Date |
|---|---|---|
| 556,073 | France | Apr. 6, 1923 |
| 22,598 | France | Feb. 8, 1921 |
| | (Addition to No. 461,267) | |
| 32,273 | France | May 10, 1927 |
| | (Addition to No. 614,733) | |
| 49,222 | Germany | Oct. 21, 1889 |
| 163,967 | Germany | Oct. 26, 1905 |
| 165,515 | Germany | Nov. 17, 1905 |
| 1,150 | Great Britain | of 1872 |
| 571,354 | Great Britain | Aug. 21, 1945 |
| 940 | Switzerland | May 7, 1889 |
| 7,339 | Switzerland | Sept. 20, 1893 |